(12) United States Patent
Morrow et al.

(10) Patent No.: US 7,162,609 B2
(45) Date of Patent: Jan. 9, 2007

(54) TRANSLATION LOOKASIDE BUFFER PREDICTION MECHANISM

(75) Inventors: Michael W. Morrow, Chandler, AZ (US); Dennis M. O'Connor, Chandler, AZ (US); Desikan Iyadurai, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 502 days.

(21) Appl. No.: 10/726,885

(22) Filed: Dec. 3, 2003

(65) Prior Publication Data

US 2005/0125628 A1 Jun. 9, 2005

(51) Int. Cl.
*G06F 12/10* (2006.01)

(52) U.S. Cl. .................................. 711/207; 711/137
(58) Field of Classification Search ................ 711/207, 711/137
See application file for complete search history.

(56) References Cited

U.S. PATENT DOCUMENTS 5,893,930 A * 4/1999 Song .......................... 711/205

* cited by examiner

*Primary Examiner*—Hiep T. Nguyen

(57) ABSTRACT

According to one embodiment a central processing unit (CPU) is disclosed. The CPU includes a translation lookaside buffer (TLB). The TLB predicts a set index value prior to the generation of an effective address.

24 Claims, 5 Drawing Sheets

TRANSLATION LOOKASIDE BUFFER PREDICTION MECHANISM

FIELD OF THE INVENTION

The present invention relates to computer systems; more particularly, the present invention relates to processors.

BACKGROUND

Contemporary computer systems implement virtual memory systems in order to create the illusion of a very large amount of memory that is exclusively available for each application run on a system. Typically, a specific amount of virtual memory is made available to each application, with each application being provided a separate space identifier that is used to separate memory associated with a particular application from others. The virtual memory is mapped to physical memory.

Mapping from a virtual address to a physical address is handled by a translation lookaside buffer (TLB). The TLB is a cache within a microprocessor that provides translations in the form of page table entries. The translations are typically generated using data structures in memory called "page tables", using an algorithm implemented in hardware or software. The results of executing this algorithm are stored in the TLB for future use. In conventional TLB pipelines, an effective address must be generated before the TLB can be indexed for a translation. However, having to wait for an address to be generated results in longer translation times.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
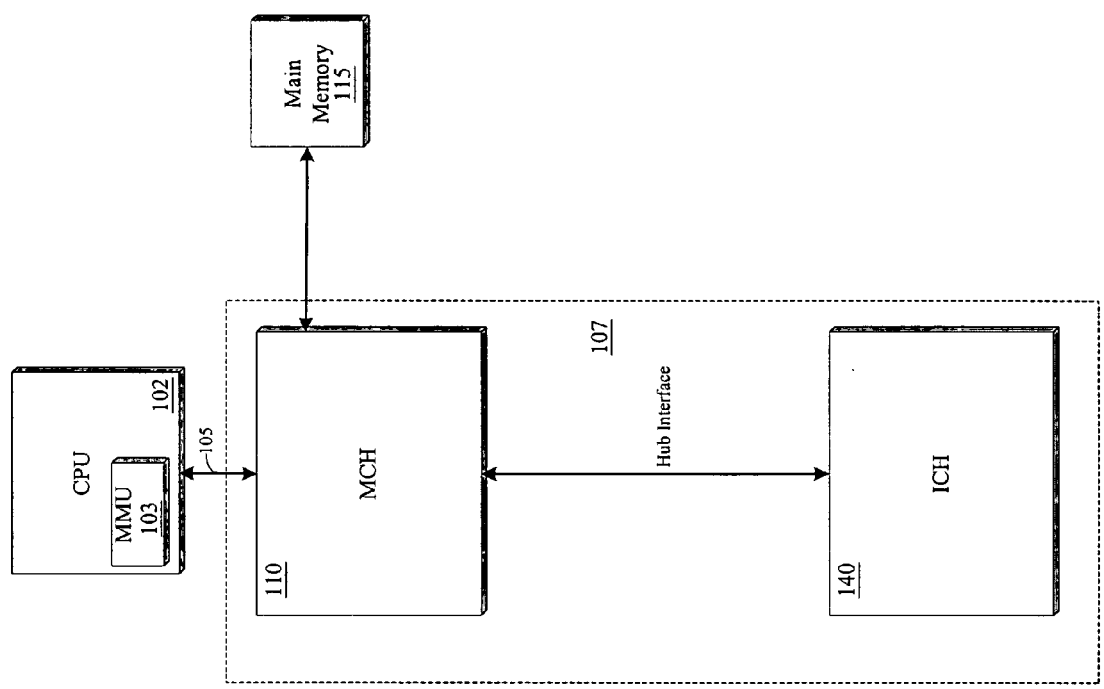
FIG. 1 illustrates one embodiment of a computer system.

A prediction mechanism for a translation lookaside buffer (TLB) is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif.

Alternatively, one of ordinary skill in the art will appreciate that other CPUs may be used.

A chipset 107 is also coupled to bus 105. Chipset 107 includes a memory control hub (MCH) 110. MCH 110 is coupled to a main system memory 115. Main system memory 115 stores data and sequences of instructions and code represented by data signals that may be executed by CPU 102 or any other device included in system 100.

In one embodiment, main system memory 115 includes dynamic random access memory (DRAM); however, main system memory 115 may be implemented using other memory types. Additional devices may also be coupled to bus 105, such as multiple CPUs and/or multiple system memories.

In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Array Interconnect bus adhering to a Specification Revision 2.1 bus developed by the PCI Special Interest Group of Portland, Oreg. One of ordinary skill in the art will appreciate that other components may be included within computer system 100. For example, computer system 100 may include an antenna to enable the implementation of wireless applications.

According to one embodiment, CPU 102 includes a memory management unit (MMU) 103. MMU 103 manages physical memory resources for computer system 100. In one embodiment, MMU 103 implements a virtual memory system to create an illusion of a very large amount of memory that is exclusively available for each application run on computer system 102.

Figure 2:
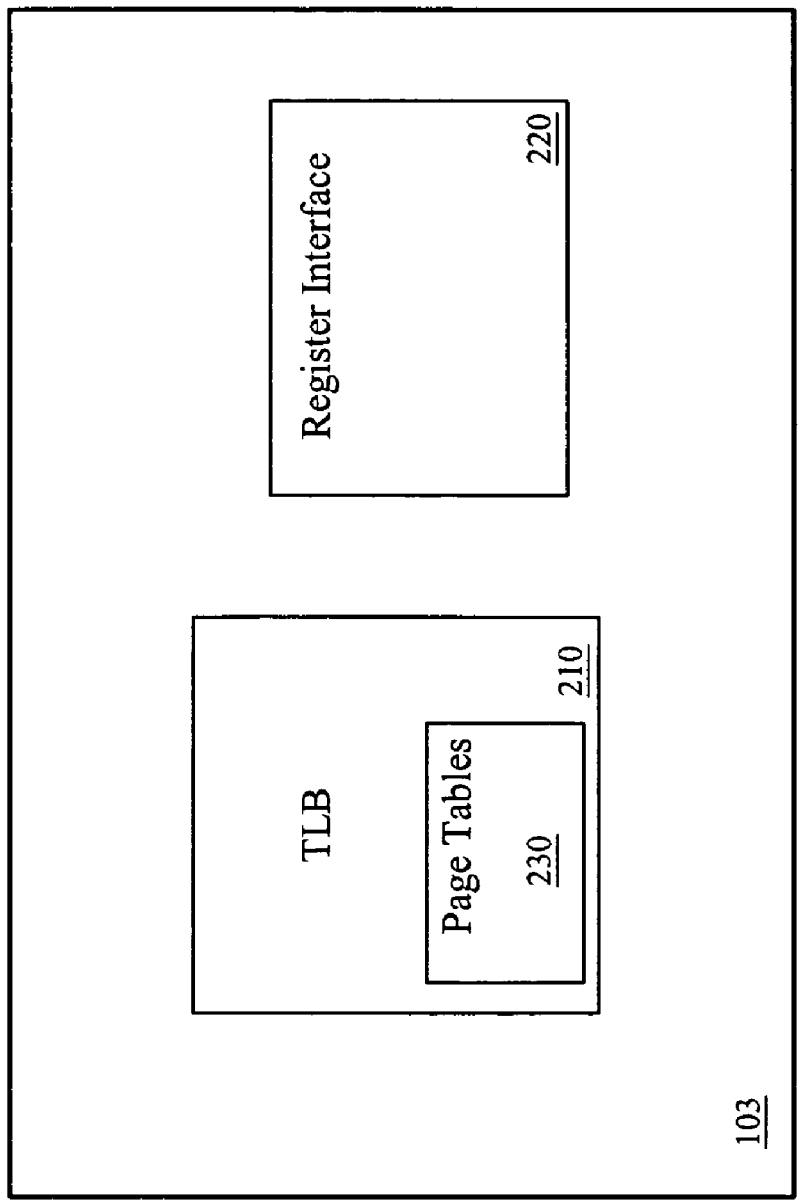
FIG. 2 illustrates one embodiment of a memory management unit.

FIG. 2 illustrates of one embodiment of MMU 103. MMU 103 includes TLB 210 and register interface 220. TLB 210 is a hardware cache that includes virtual address to physical address translations, and typically provides other information as well, such as the cacheability and access permissions of the addressed area. In one embodiment, TLB 210 includes copies of page table entries (PTEs) 230 from memory 115 that hardware or software heuristics have determined are most likely to be useful in the future.

In particular, TLB 210 includes the virtual to physical address translations for the current active addresses being used in memory 115. Consequently, it is not necessary to access PTEs in memory 115 each time an address translation is performed. Register interface 220 includes a multitude of registers that are used to control TLB 210. For instance, register interface 220 includes one or more registers that are used to choose which PTE 230 entry is to be read from or written to TLB 210.

Figure 3:
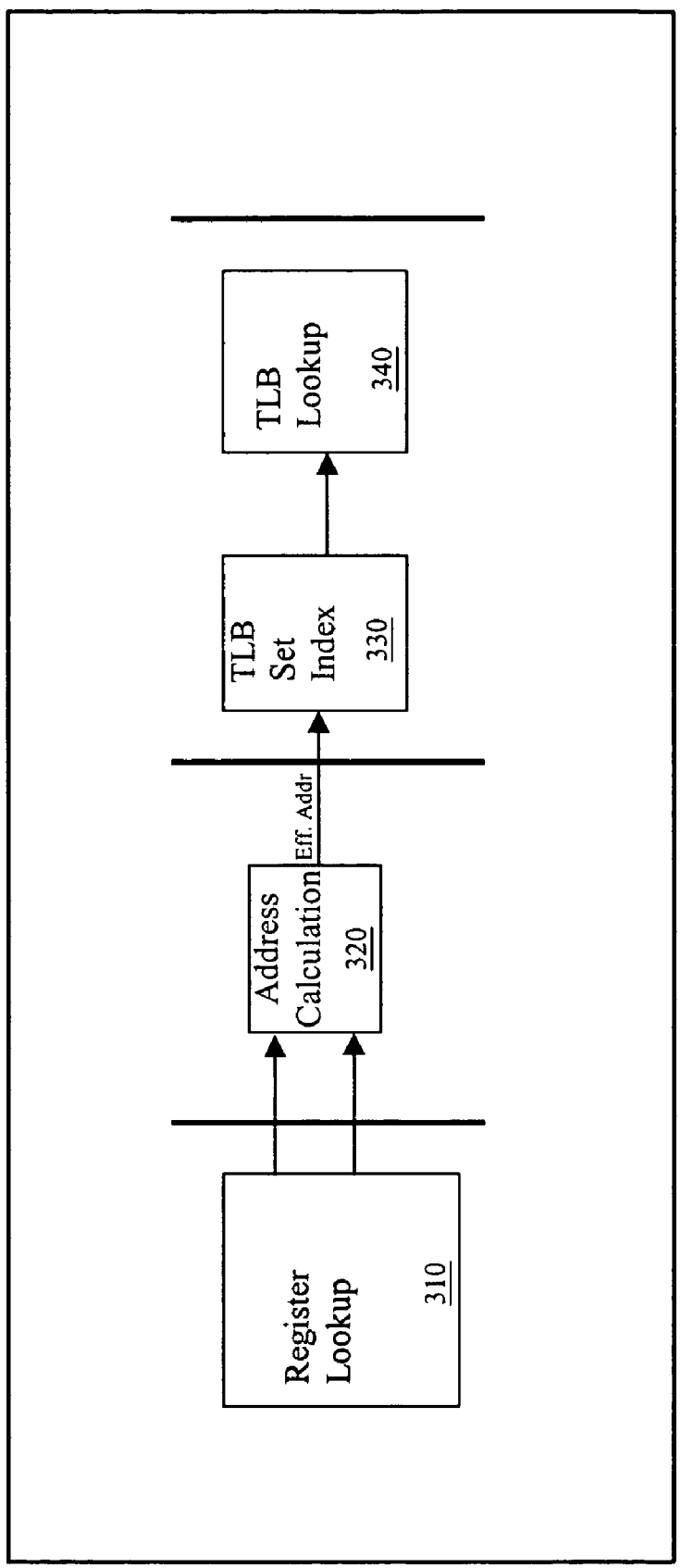
FIG. 3 illustrates one embodiment of a process pipeline for a translation lookaside buffer (TLB)

FIG. 3 illustrates one embodiment of a process pipeline for translating a virtual address to a physical address at TLB 210. At process block 310, a register lookup occurs at register interface 220. As discussed above, a PTE 230 entry is selected to be translated by TLB 210. At process block 320, address calculation occurs.

In one embodiment, the information obtained from the register lookup is used to calculate an effective address that is used to index TLB 210. In a further embodiment, the effective address includes an upper portion (e.g., upper 19 bits) of the virtual address (e.g., 32 bits) that is to be translated. At process block 330, the effective address is located within TLB 210 as determined by an index.

The effective address may be the address of an instruction that is being fetched for execution. Alternatively, the effective address may be the address of data being read or written by the processor. In one embodiment, the index is comprised of the lower bits (e.g., bits 13–16) of the effective address. At process block 340, a lookup of TLB 210 occurs in which the virtual address is associated with a corresponding physical address.

The problem with the above-described process is that the effective address must be generated before TLB 210 can be indexed. As discussed above, having to wait for an address to be generated results in longer translation times. According to one embodiment, information received from the register lookup is used to index TLB 210 prior to calculation of an effective address.

Figure 4:
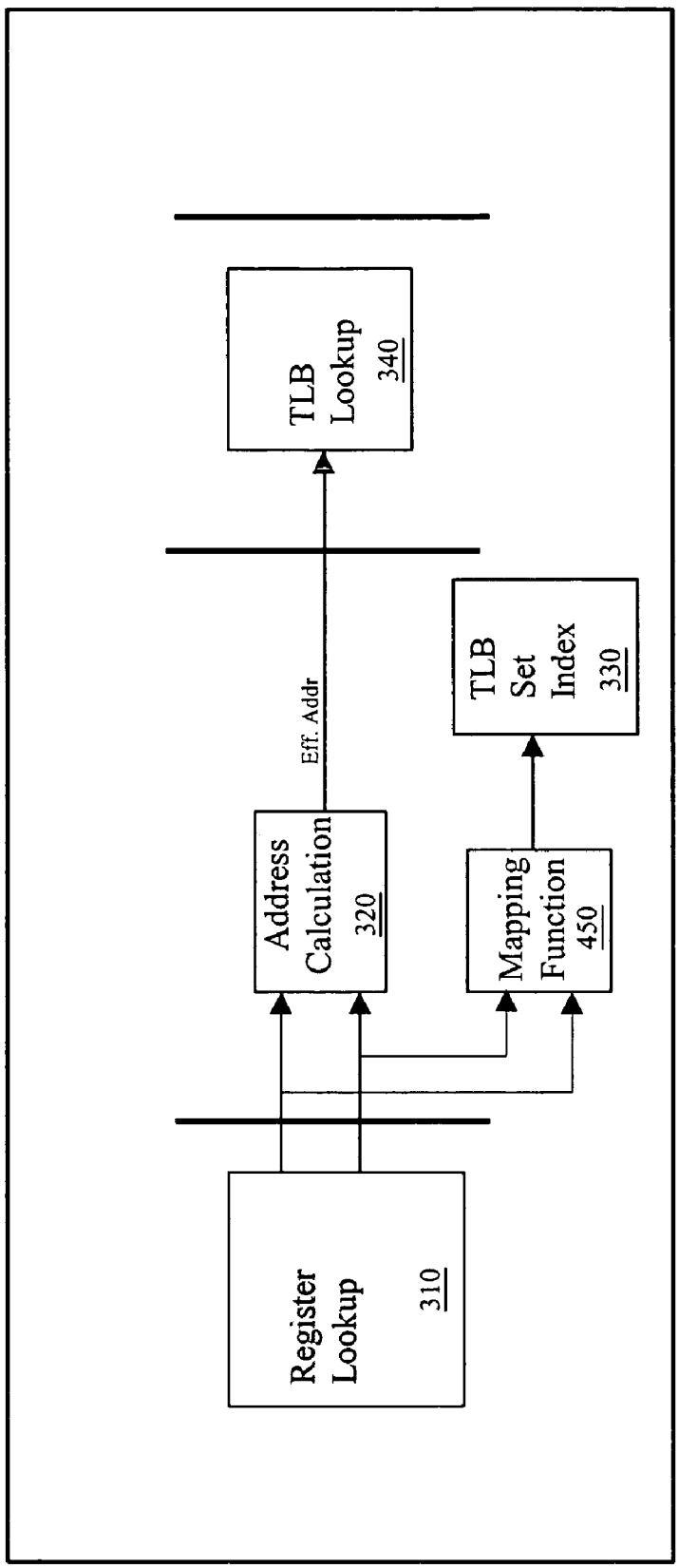
FIG. 4 illustrates another embodiment of a TLB process pipeline.

FIG. 4 illustrates another embodiment of a TLB 210 process pipeline. Similar to the process shown in FIG. 3, the register lookup 310, address calculation 310, index 330 and TLB lookup 340 process blocks are included. However, a mapping function 450 process block is also included.

Mapping function 450 uses information received from register lookup and predicts the TLB 210 index at process block 450. In one embodiment, the predicted index may not be the same index as provided by a conventional effective-address calculation. However, the prediction will typically yield the same index for the same input address.

TLB misses result in PTE's being filled into the predicted set, which may differ from the set implied by the calculated effective address. In the instances where an address was mapped to a different index than it did in a previous instruction, the new index does not require a back up computation. Consequently, the worst effect would be duplicate TLB 210 entries.

In this system, basic bits are still compared to determine a match, just as would occur if TLB 210 were fully associative. Further, mapping function 450 provides a relatively uniform output based on the input, so that TLB 210 entries are distributed throughout TLB 210 instead of bunched up in just a couple of entries. Note that in conventional a set-associative TLB, the bits used as the set index are not used in the compare that takes place in the TLB lookup 340 process.

According to one embodiment, mapping function 450 can be any function that operates quickly enough that the selection of the appropriate set within the TLB 210 entries can occur significantly more quickly than if the actual effective address was used to select the set. For example, mapping function 450 may be implemented using a N-bit add modulo $2^N$ of some base-register bits and some offset bits, where N is small. In another embodiment, mapping function 450 may be an Exclusive-OR of some base-register bits and some offset bits.

Figure 5:
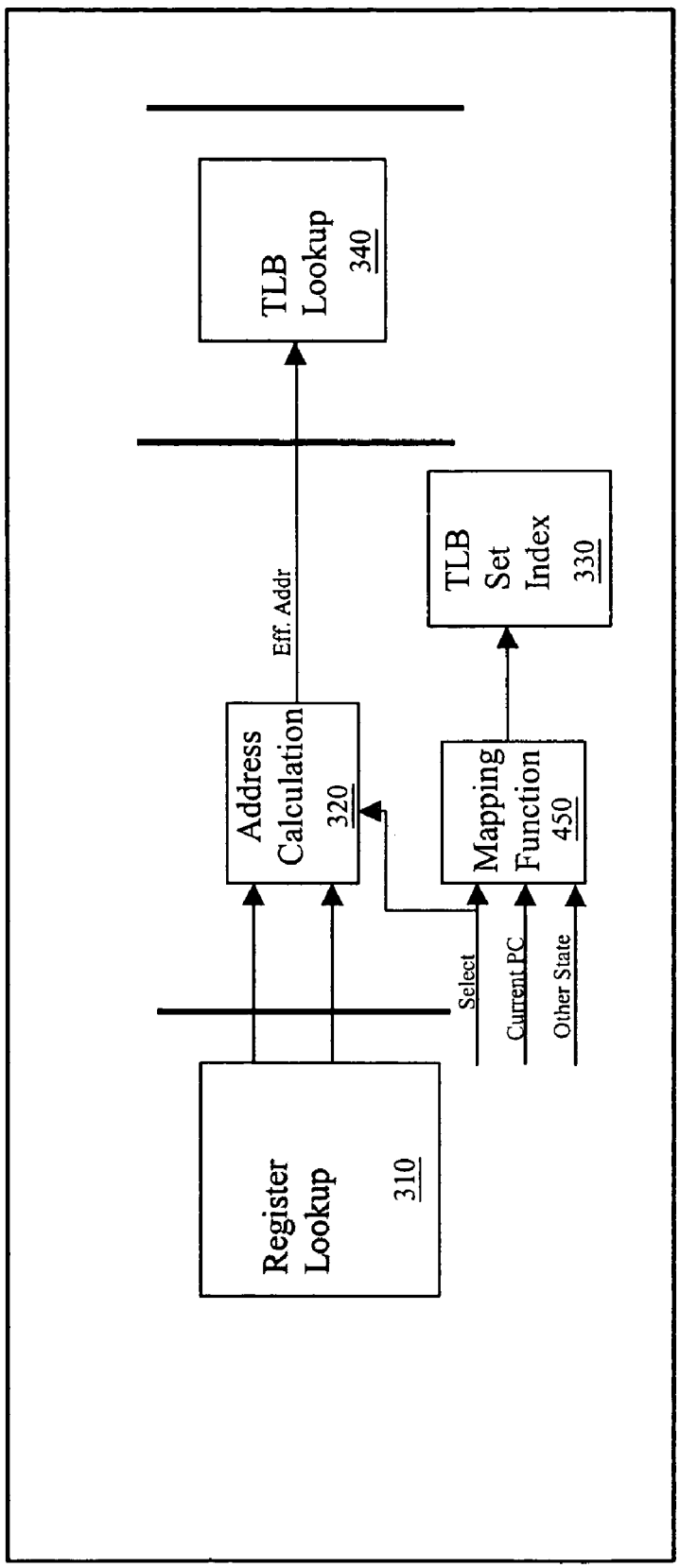
FIG. 5 illustrates yet another embodiment of a TLB process pipeline.

In yet another embodiment, signals from the pipeline not normally used in address calculation (such as a branch-taken indication) can be used by the mapping function to form the index. FIG. 5 illustrates another embodiment of a TLB process pipeline, where control signal are used to predict an effective address. In an instruction TLB 210 (e.g., a TLB that does translation for instruction addresses), mapping function 450 may use one or more bits from a current program counter PC with a signal indicating that a branch had occurred.

In response mapping function 450 combines the signals using a simple hash to predict which set to look up the translation for the address of the branch. This allows the set to be chosen when only the current program counter and the fact that a branch had occurred were known, which might be significantly before when the target address of the branch was available on the output of the address calculation. As discussed above, the TLB 210 set index might not be the same index as the selected address would provide.

The above-described prediction mechanism operates correctly, notwithstanding mis-predictions, such that no corrective action need be taken upon the occurrence of a misprediction. Further, the prediction mechanism conserves processing time in a TLB lookup stage, which is often a constricted area for timing. This enables more logic to operate on the output of the TLB in the same stage. Alternatively, the time savings enables the use of larger TLB arrays, or allows the process pipeline to be clocked at a higher speed (if the TLB is a speed path). In aggressively pipelined systems, it may allow a reduction in the pipeline length, which increases the performance per clock.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A central processing unit (CPU) comprising:
   a translation lookaside buffering; and
   a mapping logic function to predict a set index value for the TLB prior to the generation of an effective address, the mapping logic having a N-bit add modulo $2^N$ function of base-register bits and offset bits of a virtual address, where N is smaller than the number of bits in a virtual address.

2. The CPU of claim 1 wherein the mapping logic function distributes entries within the TLB throughout the TLB.

3. A central processing unit (CPU) comprising:
   a translation lookaside buffering; and
   a mapping logic function to predict a set index value for the TLB prior to the generation of an effective address, the mapping logic having an Exclusive- or of some number of base-register bits and some number of offset bits of a virtual address.

4. The CPU of claim 3 further comprising a register interface having one or more registers to control the TLB.

5. The CPU of claim 4 wherein the one or more registers within the register interface chooses an entry within the TLB to be accessed.

6. A central processing unit (CPU) comprising:
   a translation lookaside buffering; and
   a mapping logic function to predict a set index value for the TLB prior to the generation of an effective address, wherein the predicted set index may differ from the effective address without requiring recovery actions if the predicted set index and the effective address differ.

7. The CPU of claim 6 wherein mapping logic function includes a first set of bits from instruction and a second set of bits from base and offset addresses.

8. The CPU of claim 6 wherein the effective address being mapped is the address of an instruction that is being fetched for execution.

9. The CPU of claim 6 wherein the effective address being mapped is the address of data being read or written by the processor.

10. A central processing unit (CPU) comprising:
    a translation lookaside buffering; and
    a mapping logic function to predict a set index value for the TLB prior to the generation of an effective address, the mapping logic function includes control signals received from the processor and bits received from the generation of the effective address.

11. The CPU of claim 10 wherein the mapping logic combines the signals and the bits using a hash to predict a set to look up the translation for the predicted address.

12. A method comprising:
    looking up a register at a register interface; and
    predicting a set index value for a translation lookaside buffer (TLB) at a mapping logic function having an Exclusive- or of some number of base-register bits and some number of offset bits of a virtual address prior to the generation of an effective address.

13. The method of claim 12 further comprising performing a lookup of the TLB using the predicted set index.

14. The method of claim 12 further comprising calculating an effective address.

15. The method of claim 12 wherein the predicted set index differs from the effective address.

16. A computer system comprising central processing unit (CPU) having a mapping logic function to predict a set index value for a translation lookaside buffer (TLB) prior to the generation of an effective address, the mapping logic function having a N-bit add modulo $2^N$ function of base-register bits and offset bits of a virtual address, where N is smaller than the number of bits in a virtual address.

17. The computer system of claim 16 wherein the mapping logic function distributes entries within the TLB throughout the TLB.

18. The computer system of claim 16 wherein the mapping logic function comprises an Exclusive- or of some number of base-register bits and some number of offset bits of a virtual address.

19. The computer system of claim 16 further comprising a register interface having one or more registers to control the TLB.

20. The computer system of claim 19 wherein the one or more registers within the register interface chooses an entry within the TLB to be accessed.

21. The computer system of claim 16 wherein the mapping logic function includes control signals received from the processor and bits received from the generation of the effective address.

22. The computer system of claim 21 wherein the mapping logic combines the signals and the bits using a hash to predict a set to look up the translation for the predicted address.

23. A computer system comprising:
    central processing unit (CPU) having a mapping logic function to predict a set index value for a translation lookaside buffer (TLB) prior to the generation of an effective address, the mapping logic having a N-bit add modulo $2^N$ function of base-register bits and offset bits of a virtual address, where N is smaller than the number of bits in a virtual address;
    a chipset coupled to the CPU and
    a main memory coupled to the chipset.

24. The computer system of claim 23 wherein the mapping logic function distributes entries within the TLB throughout the TLB.

* * * * *